United States Patent
Tsuji et al.

(10) Patent No.: US 11,561,283 B2
(45) Date of Patent: Jan. 24, 2023

(54) DISTANCE MEASUREMENT APPARATUS, DISTANCE MEASUREMENT METHOD AND PROGRAM

(71) Applicant: NEC Corporation, Tokyo (JP)

(72) Inventors: Akira Tsuji, Tokyo (JP); Junichi Abe, Tokyo (JP); Hidemi Noguchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 309 days.

(21) Appl. No.: 16/763,206

(22) PCT Filed: Nov. 15, 2018

(86) PCT No.: PCT/JP2018/042241
§ 371 (c)(1),
(2) Date: May 11, 2020

(87) PCT Pub. No.: WO2019/098263
PCT Pub. Date: May 23, 2019

(65) Prior Publication Data
US 2020/0333460 A1    Oct. 22, 2020

(30) Foreign Application Priority Data
Nov. 16, 2017 (JP) .............................. JP2017-220919

(51) Int. Cl.
*G01S 17/10* (2020.01)
*G01S 17/32* (2020.01)
(Continued)

(52) U.S. Cl.
CPC ............ *G01S 7/4814* (2013.01); *G01S 7/481* (2013.01); *G01S 17/10* (2013.01); *G01S 17/32* (2013.01); *G01S 17/89* (2013.01)

(58) Field of Classification Search
CPC ........ G01S 7/4814; G01S 17/32; G01S 17/89; G01S 7/10
See application file for complete search history.

(56) References Cited

U.S. PATENT DOCUMENTS

| | | | |
|---|---|---|---|
| 7,570,346 B2 | 8/2009 | Yamaguchi et al. | |
| 7,884,923 B2 | 2/2011 | Kumagai et al. | |
| (Continued) | | | |

FOREIGN PATENT DOCUMENTS

| | | |
|---|---|---|
| JP | H03-077011 A | 4/1991 |
| JP | H05-012414 A | 1/1993 |
| (Continued) | | |

OTHER PUBLICATIONS

Japanese Office Action for JP Application No. 2019-554273 dated Oct. 5, 2021 with English Translation.
(Continued)

*Primary Examiner* — Minh Q Phan

(57) ABSTRACT

A distance measurement apparatus comprises a distance measurement optical signal generation part, a collimating part, a beam diameter change part, an emission direction control part, and a beam diameter change control part. The distance measurement optical signal generation part generates an optical signal for measuring the distance to a target. The collimating part collimates the optical signal. The beam diameter change part is able to change a beam diameter of the collimated light. The emission direction control part controls an emission destination of the collimated light with the diameter changed. The beam diameter change control part controls the changing of the beam diameter by the beam diameter change part according to the emission direction of an outgoing.

16 Claims, 13 Drawing Sheets

(51) Int. Cl.
*G01S 17/89* (2020.01)
*G01S 7/481* (2006.01)

(56) References Cited

U.S. PATENT DOCUMENTS

| | | |
|---|---|---|
| 2006/0215148 A1 | 9/2006 | Yamaguchi et al. |
| 2010/0091263 A1 | 4/2010 | Kumagai et al. |
| 2013/0092837 A1* | 4/2013 | Yamashita ............ H01J 37/252 250/307 |
| 2013/0121564 A1 | 5/2013 | Kitamura et al. |
| 2016/0103210 A1 | 4/2016 | Ochimizu et al. |
| 2016/0187248 A1* | 6/2016 | Liu ........................... G03F 7/00 356/369 |
| 2016/0356888 A1 | 12/2016 | Ohnishi |
| 2017/0285146 A1 | 10/2017 | Iida et al. |
| 2018/0364333 A1 | 12/2018 | Jungwirth et al. |

FOREIGN PATENT DOCUMENTS

| | | |
|---|---|---|
| JP | H08-193832 A | 7/1996 |
| JP | 2001-050723 A | 2/2001 |
| JP | 2001-051058 A | 2/2001 |
| JP | 2004-354253 A | 12/2004 |
| JP | 2006-258604 A | 9/2006 |
| JP | 2010-0091445 A | 4/2010 |
| JP | 2011-053137 A | 3/2011 |
| JP | 2017-003284 A | 1/2017 |
| JP | 2017-161500 A | 9/2017 |
| JP | 2017-181209 A | 10/2017 |
| WO | WO 2012/005140 A1 | 1/2012 |
| WO | 2014/192805 A1 | 12/2014 |
| WO | WO 2016/134321 A1 | 8/2016 |

OTHER PUBLICATIONS

International Search Report dated Feb. 19, 2019, in corresponding PCT International Application.

Extended European Search Report dated Dec. 15, 2020, issued by the European Patent Office in counterpart European Patent Application No. 18879537.1.

* cited by examiner

FIG. 3

140; STORAGE AREA

| HORIZONTAL DIRECTION [rad] | VERTICAL DIRECTION [rad] | BEAM DIAMETER |
|---|---|---|
| 0 | 0 | 2mm |
| π/2 | 0 | 10mm |
| π | 0 | 5mm |
| 3π/2 | 0 | 2mm |
| ⋮ | ⋮ | ⋮ |

20b: ENVIRONMENTAL INFORMATION HOLDING PART

| VERTICAL | HORIZONTAL | DEPTH | POSITION (x,y) | SIZE |
|---|---|---|---|---|
| 0.5m | 2m | 1.5m | (10cm, 10cm) | 3cm×3cm |
| 2m | 2m | 3m | (50cm, 30cm) | 5cm×15cm |
| ... | ... | ... | ... | ... |

200 — VERTICAL
202 — HORIZONTAL
204 — DEPTH
206 — POSITION
208 — SIZE

DISTANCE MEASUREMENT APPARATUS, DISTANCE MEASUREMENT METHOD AND PROGRAM

REFERENCE TO RELATED APPLICATION

The present invention is based upon and claims the benefit of the priority of Japanese patent application No. 2017-220919 filed on Nov. 16, 2017, the disclosure of which is incorporated herein in its entirety by reference thereto.

FIELD

The present invention relates to a distance measurement apparatus, distance measurement method and program, and particularly to a distance measurement apparatus, distance measurement method and program using a laser.

BACKGROUND

In recent years, LiDAR (Light Detection And Ranging) using a laser has been utilized in various technical fields. For example, in autonomous driving field, a technology that measures a distance to an obstacle using a laser is utilized. Further, in civil engineering and construction fields, a technology that three-dimensionally scans an object using a laser is utilized.

A LiDAR apparatus (distance measurement apparatus using a laser) outputs a laser using an infrared light etc. to detect a light reflected at a target and returned therefrom. A distance to the target is calculated based on information such as time required from output of the laser until detection of a reflected light and a phase difference between the reflected light and a reference light. Further, a wide range of distance data associated with data indicating direction from the LiDAR apparatus, including 360 degrees around the LiDAR apparatus, can be obtained by rotating an output of a laser or by reflecting a laser using a movable mirror. By plotting points on three-dimensional coordinates based on distance data obtained, a three-dimensional model around the LiDAR apparatus can be drawn.

In LiDAR, one item of data on reflected light can be obtained for each point irradiated by a laser. A set of data points obtained for each point can be handled in a format called point group data (point cloud). For example, each point in point cloud data can be represented by coordinates in a three-dimensional orthogonal coordinate system of (x, y, z). This format (point cloud data format) works well with LiDAR, which is capable of acquiring three-dimensional data.

A LiDAR apparatus with high accuracy can acquire distance data with an accuracy of a centimeter in a range that can be reached by a laser (e.g., several tens of meters or more). Such a high-accuracy LiDAR apparatus tends to deal with a large amount of acquired data and requires a high-performance server or an accelerator such as a GPU (Graphics Processing Unit) for data processing.

Normally, in utilization of LiDAR, measurement data is often sent via a network from a LiDAR apparatus to a facility such as a data center equipped with computing resources. When a large amount of data is transmitted via a network, a communication delay becomes an issue. In particular, it is difficult to implement an application that provides services that require real-time processing on an order of seconds while using LiDAR data. On the other hand, high-performance computing resources may be combined with a LiDAR apparatus, which in turn can locally process point cloud data, however, applications would be limited in terms of system size, weight, and power consumption are considered.

Patent Literature 1 discloses a technology that reduces computational complexity in generating a three-dimensional shape from point cloud data by detecting a plane from the data (point cloud data) acquired by a LiDAR apparatus and generating a three-dimensional shape of an object from the plane.

Patent Literature 2 describes a step of setting a beam diameter of a laser beam to be emitted according to an approximate distance to a target object and a step of emitting the laser beam toward a measurement target. Further, Patent Literature 2 describes a step of receiving a reflected light of from the measurement target irradiated by the laser beam and a step of measuring a distance to the measurement target based on the received reflected light.

Patent Literature 3 describes changing a spread angle of a pulsed laser beam light to be irradiated according to widths of azimuth and elevation angles of a monitored area.

[Patent Literature 1]
International Publication Number WO2012/005140
[Patent Literature 2]
Japanese Patent Kokai Publication No. JP2010-091445A
[Patent Literature 3]
Japanese Patent Kokai Publication No. JP2004-354253A

SUMMARY

Further, the disclosure of each Patent Literature cited above is incorporated herein in its entirety by reference thereto. The following analysis is given by the inventors of the present invention.

As described above, Patent Literature 1 reduces an amount of processing performed after point cloud data is acquired. However, this does not reduce a delay caused by transmitting point cloud data to computing resources that process the point cloud data, because a total amount of point cloud data itself is not reduced. Therefore, it is still difficult to implement an application (service, system) that requires real-time processing on an order of seconds, even if the technology disclosed in Patent Literature 1 is applied.

It is an object of the present invention to provide a distance measurement apparatus, distance measurement method and program, each capable of contributing to realization of reducing size of acquired data.

According to a first aspect of the present invention or disclosure, there is provided a distance measurement apparatus comprising: a distance measurement optical signal generation part that generates a distance measurement optical signal for measuring a distance to a target object; a collimating part that converts the distance measurement optical signal generated by the distance measurement optical signal generation part to a collimated light which is a parallel light; a beam diameter change part configured to be able to change a beam diameter of the collimated light emitted by the collimating part; an emission direction control part that controls an emission destination of the collimated light with the beam diameter thereof changed by the beam diameter change part; and a beam diameter change control part that controls changing of the beam diameter by the beam diameter change part according to the emission direction of an outgoing light emitted from the distance measurement apparatus to outside thereof.

According to a second aspect of the present invention or disclosure, there is provided a distance measurement method in a distance measurement apparatus including:

a distance measurement optical signal generation part that generates a distance measurement optical signal for measuring the distance to a target object;

a collimating part that converts the distance measurement optical signal generated by the distance measurement optical signal generation part to a collimated light which is a parallel light;

a beam diameter change part configured to be able to change a beam diameter of the collimated light emitted by the collimating part; and an emission direction control part that changes an emission destination of the collimated light with a beam diameter changed by the beam diameter change part, the distance measurement method comprising:

obtaining the emission direction of an outgoing light emitted by the distance measurement apparatus; and controlling the changing of the beam diameter performed by the beam diameter change part according to the emission direction obtained.

According to a third aspect of the present invention or disclosure, there is provided a program causing a computer provided in a distance measurement apparatus including:

a distance measurement optical signal generation part that generates a distance measurement optical signal for measuring the distance to a target object;

a collimating part that converts the distance measurement optical signal generated by the distance measurement optical signal generation part to a collimated light which is a parallel light;

a beam diameter change part configured to be able to change a beam diameter of the collimated light emitted by the collimating part; and an emission direction control part that changes an emission destination of the collimated light with a beam diameter changed by the beam diameter change part, to execute processing including:

obtaining an emission direction of an outgoing light emitted from the distance measurement apparatus to outside; and controlling changing of the beam diameter by the beam diameter change part according to the emission direction obtained.

According to each aspect of the present invention or disclosure, there are provided a distance measurement apparatus, distance measurement method and program that can contribute to realization of reducing size of acquired data.

BRIEF DESCRIPTION OF THE DRAWINGS

FIG. 3 is a diagram illustrating an example of a table provided in a beam diameter change part relating to the first example embodiment.

FIG. 11 is a diagram illustrating another arrangement example of the environmental information storage part relating to the third example embodiment.

DETAILED DESCRIPTION

Figure 1:
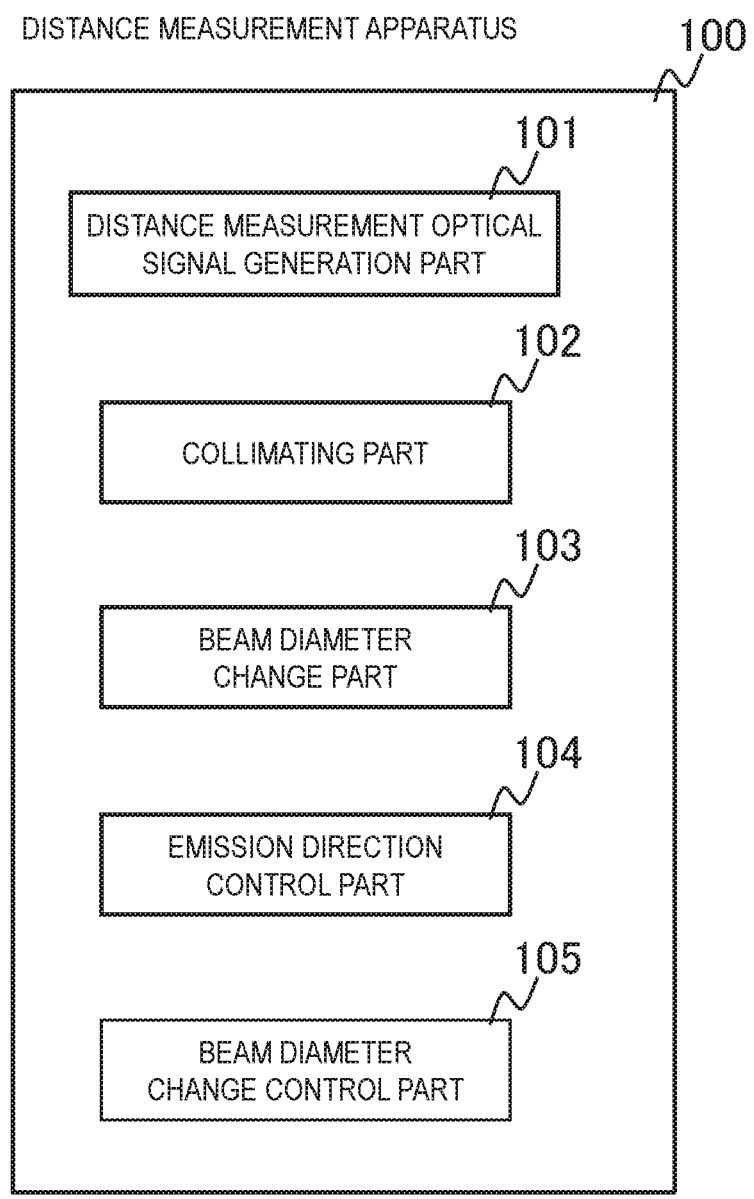
FIG. 1 is a drawing for explaining an outline of an example embodiment.

First, an outline of an example embodiment will be described. Note that drawing reference signs in the outline are given to each element as an example solely to facilitate understanding for convenience, and the description in the outline is not intended to limit the present invention. Further, connection lines between blocks in the drawings can be both bidirectional and unidirectional, Unidirectional arrows schematically indicate main flows of signals (data) and do not exclude bidirectionality. In addition, in circuit diagrams, block diagrams, internal arrangement diagrams, and connection diagrams shown in the disclosure of the present application, an input port and output port exist at an input end and output end of each connection line, respectively, although not explicitly shown. The same applies to input/output interfaces.

A distance measurement apparatus 100 relating to an example embodiment comprises a distance measurement optical signal generation part 101, a collimating part 102, a beam diameter change part 103, an emission direction control part 104, and a beam diameter change control part 105. The distance measurement optical signal generation part 101 generates a distance measurement optical signal for measuring a distance to a target. The collimating part 102 collimates the distance measurement optical signal generated by the distance measurement optical signal generation part 101 to a collimated beam which is made up of parallel rays. The beam diameter change part 103 is configured to be able to change a beam diameter of the collimated light emitted by the collimating part 102. The emission direction control part 104 controls an emission destination of the collimated light with the diameter thereof changed by the beam diameter change part 103. The beam diameter change control part 105 controls changing of the beam diameter by the beam diameter change part 103 according to the emission direction of an outgoing light emitted to outside from the apparatus.

Usually, when a beam diameter of a laser is increased, a LiDAR (distance measurement) apparatus cannot capture shapes of details of an object, but an amount of point cloud data can be reduced since a wider range is measured as one measurement point (coarse measurement). On the other hand, when a beam diameter of the laser is decreased, the apparatus is able to capture shapes of details of the object, but the amount of point cloud data increases, since a narrower range is measured as one measurement point (fine measurement). In such situations, the distance measurement apparatus 100 can minimize the amount of acquired data by dynamically changing a laser beam diameter according to measurement data and installation environment. In other words, if an environment in which the distance measurement apparatus 100 is installed is known in advance, it is possible to obtain information on presence of an object in each emission direction with the distance measurement apparatus 100 as a reference. As a result, flexible measures can be taken such as decreasing a beam diameter in a specific direction, while increasing it in another direction. Further, by reducing an amount of acquired data (total amount of data), i.e., by reducing an amount of acquired point cloud data, it is made possible to realize reduction of a delay required for data transmission/reception and also reduction of processing amount due to the reduced data amount. Therefore, the distance measurement apparatus 100 is suitable for applications that require real-time processing.

The following describes specific example embodiments in more detail with reference to the drawings. In each example embodiment, the same elements are denoted by the same reference signs, and the description thereof will be omitted.

FIRST EXAMPLE EMBODIMENT

A first example embodiment will be described in detail with reference to the drawings.

Figure 2:
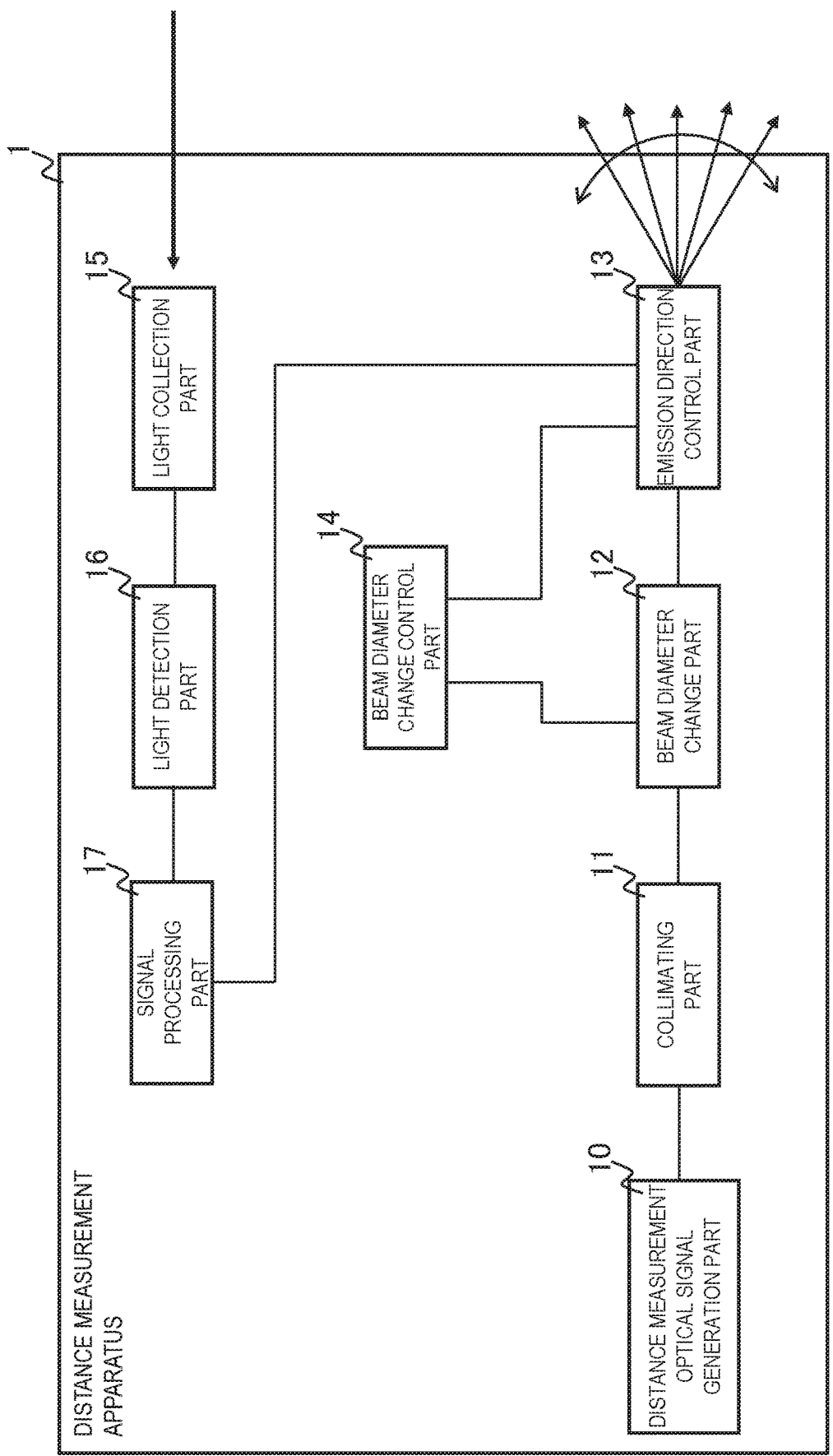
FIG. 2 is a diagram illustrating an arrangement example of a distance measurement apparatus relating to a first example embodiment.

FIG. 2 is a diagram illustrating an arrangement example of a distance measurement apparatus 1 relating to the first example embodiment. With reference to FIG. 2, the distance measurement apparatus 1 is configured to include a distance measurement optical signal generation part 10, a collimating part 11, a beam diameter change part 12, an emission direction control part 13, a beam diameter change control part 14, a light collection part 15, a light detection part 16, and a signal processing part 17.

The distance measurement optical signal generation part 10 is a means that generates a distance measurement optical signal for measuring the distance to a target. In other words, the distance measurement optical signal generation part 10 oscillates a laser used for measurement. The laser emitted from the distance measurement optical signal generation part 10 enters the collimating part 11. The distance measurement optical signal generation part 10 may be configured to modulate amplitude, frequency, or phase of the oscillated laser. Whether or not to perform amplitude modulation or the like depends on information used to measure a distance. Since presence or absence of the modulation does not affect an arrangement of the distance measurement apparatus 1, details regarding the modulation are omitted.

The collimating part 11 is a means that collimates rays of the distance measurement optical signal generated by the distance measurement optical signal generation part 10 to a collimated beam which is made up of parallel rays. In other words, the collimating part 11 collimates rays of a laser oscillated by the distance measurement optical signal generation part 10. The collimated light emitted from the collimating part 11 enters the beam diameter change part 12.

The beam diameter change part 12 is configured to be able to change a beam diameter of the collimated light emitted by the collimating part 11. In other words, the beam diameter change part 12 is a means that changes a beam diameter of the collimated light entered from the collimating part 11. The beam diameter change part 12 is able to change a beam diameter using the function of a beam expander. A beam expander allows changing a laser beam diameter within a specified range thereof.

The beam diameter change part 12 adjusts a beam diameter under control of the beam diameter change control part 14. More specifically, the beam diameter is adjusted according to a direction in which the distance measurement apparatus 1 emits a laser. The laser with the beam diameter thereof adjusted enters to the emission direction control part 13.

The emission direction control part 13 is a means that controls an emission direction of the collimated light with the diameter thereof changed by the beam diameter change part 12. In other words, the emission direction control part 13 adjusts a direction of the laser emitted from the distance measurement apparatus 1. For example, the function of the emission direction control part 13 is implemented by changing a direction of a mirror that reflects the laser with beam diameter thereof adjusted, emitted from the beam diameter change part 12. The emission direction control part 13 notifies the signal processing part 17 of information on the emission direction of the laser (e.g., an identifier indicating a direction). Further, the emission direction control part 13 notifies the beam diameter change control part 14 of information on a direction (e.g., an identifier indicating a direction) into which a laser will next be emitted.

It is noted that the signal processing part 17 and the beam diameter change control part 14 can also determine a laser emission direction from time without relying on a notification from the emission direction control part 13. For example, when the laser emission direction can be calculated from an elapsed time since a reference time when the distance measurement apparatus 1 has been started, the beam diameter change control part 14 and the signal processing part 17 can determine the laser emission direction from a current time.

The beam diameter change control part 14 is a means that controls the changing of the beam diameter performed by the beam diameter change part 12 according to an emission direction of an outgoing light emitted by the distance measurement apparatus 1. In other words, the beam diameter change control part 14 controls the changing of the beam diameter performed by the beam diameter change part 12 according to the laser emission direction. A method for controlling the changing of the beam diameter can be implemented by providing a table associating a laser emission direction(s) with a beam diameter(s) in the beam diameter change part 12 and having the beam diameter change control part 14 update an entry(ies) in the table.

FIG. 3 is a diagram illustrating an example of the table provided in the beam diameter change part 12 relating to the first example embodiment. The table shown in FIG. 3 is stored in a storage area 140 of the beam diameter change part 12. Referring to FIG. 3, the table (storage area 140) includes a horizontal direction field 1400, a vertical direction field 1401, and a beam diameter field 1402.

The storage area 140 provided in the beam diameter change part 12 stores an emission direction of an outgoing light in association with a beam diameter of the outgoing light. More specifically, the storage area 140 stores combinations of horizontal direction, vertical direction, and beam diameters within a range in which the emission direction control part 13 is able to change a laser output direction. For example, the horizontal and vertical directions are within a range of 360 degrees (0 to $2\pi$ radians) around the distance measurement apparatus 1. Alternatively, the horizontal and vertical directions may be within a range of 180 degrees (0 to π radians) around the distance measurement apparatus 1. The range of the horizontal and vertical directions takes various values depending on a specification of the emission direction control part 13.

When changing a beam diameter of an outgoing light by controlling the beam diameter change part 12, the beam diameter change control part 14 identifies an area in the storage area 140 storing the beam diameter of the outgoing light to be changed based on an identifier indicating an emission direction of the outgoing light to be changed. Then, the beam diameter change control part 14 changes the beam diameter of the outgoing light to be changed by changing the identified area. In other words, when changing the diameter of a beam (collimated light), the beam diameter change control part 14 refers to the storage area 140 in the beam diameter change part 12 based on the direction of a change target (e.g., an identifier indicating a direction of a change target). Then, the beam diameter change control part 14 changes a beam diameter setting value of a corresponding area (entry) in the storage area 140. For example, in FIG. 3, if the beam diameter change control part 14 acquires from the emission direction control part 13 information (identifier) relating to "horizontal direction 0 rad, and vertical direction 0 rad" as information on a direction of a next emitted beam, the beam diameter change control part 14 will rewrite the beam diameter field 1402 of the entry in the first row of the storage area 140 shown in FIG. 3 (rewriting "2 mm" to another value).

Regarding changing of a beam diameter made by the beam diameter change control part 14, there may be provided rules on the changing determined advance or the changing of a beam diameter may be managed by table information, etc. For example, in a case where the same direction is associated with different beam diameters depending on a time zone of a day, a function that outputs a beam diameter change amount with the time as an input may be prepared in advance, and the beam diameter change control part 14 may calculate a new beam diameter value using this function. Alternatively, table information may be provided for each time zone, and the beam diameter change control part 14 may switch the table to be referred to according to the time and obtain a required beam diameter. When there is a certain amount of information on a surrounding environment of the distance measurement apparatus 1, the rules and tables regarding changing of the beam diameter can be prepared.

Note that the control of changing a beam diameter by the beam diameter change control part 14 described above is merely an example, and the control method is not limited thereto. For example, the beam diameter change part 12 may directly obtain information on an emission direction of a laser from the emission direction control part 13 and change the beam diameter based on the information. More specifically, the beam diameter change part 12 may calculate the beam diameter based on the emission direction of a next laser in real time to set the calculated beam diameter. Alternatively, the beam diameter change control part 14 may acquire an emission direction of the next laser, calculate the beam diameter in real time, and notify the beam diameter change part 12 of the calculated beam diameter and the emission direction (setting the calculated beam diameter and the emission direction in the beam diameter change part 12). In other words, the beam diameter may be changed without providing the storage area 140 in the beam diameter change part 12 (without using table information).

The light collection part 15 is a means that collects the reflected light of a laser emitted from the distance measurement apparatus 1 and emits the collected reflected light to the light detection part 16. A laser is a collimated light (parallel light rays) until it hits an object, but the light reflected at the object is scattered. The light collection part 15 is used to collect scattered light.

The light detection part 16 is a means that receives the reflected light from the light collection part 15 and converts the light to an electric signal, which is notified to the signal processing part 17. The light detection part 16 may change a voltage value of the electric signal based on an intensity of the reflected light to notify the signal processing part 17 of the intensity of the reflected light.

The signal processing part 17 is a means that performs signal processing on an electric signal from the light detection part 16. More specifically, the signal processing part 17 performs mapping processing on three-dimensional coordinates according to distance information derived based on the emission direction notified by the emission direction control part 13 and time when the electric signal is detected from the light detection part 16. For example, the signal processing part 17 can obtain the distance information by calculating the distance based on a time of a laser propagating through space. In this case, the emission direction control part 13 records a time at which a laser is emitted. The signal processing part 17 records a time at which an electric signal is detected from the light detection part 16. The signal processing part 17 derives distance information by multiplying a difference between these two times by the speed of light.

Note that, although the emission direction control part 13 receives a laser emitted from the beam diameter change part 12 in FIG. 2, the arrangement of the distance measurement apparatus 1 is not limited thereto. For example, the beam diameter change part 12 may change a beam diameter of a laser after the emission direction control part 13 has changed an emission direction of the laser. Further, the distance measurement apparatus 1 may be configured to output a plurality of lasers. For example, the distance measurement apparatus 1 may be configured to include a plurality of the distance measurement optical signal generation parts 10, the collimating parts 11, the beam diameter change parts 12, and the emission direction control parts 13. In this case, the distance measurement apparatus 1 may be configured to include a plurality of beam diameter change control parts 14 according to the number of lasers.

The following describes effects of the distance measurement apparatus 1 relating to the first example embodiment. The distance measurement apparatus 1 of the first example embodiment is configured to be able to adjust a beam diameter of a laser according to an emission direction of the laser. Therefore, for example, if there is a certain amount of information on a surrounding environment of the distance measurement apparatus 1 and the apparatus is used for fixed-point observation, an amount of acquired data can be effectively reduced. For example, the amount of acquired data can be reduced by setting a direction in which a beam diameter is made coarse and a direction in which a beam diameter is made fine in the storage area 140, by taking the surrounding environment of the distance measurement apparatus 1 into account.

SECOND EXAMPLE EMBODIMENT

A second example embodiment will be described in detail with reference to the drawings.

In the second example embodiment, a beam diameter is changed based on measurement data. Note that in the following description of an operation of a distance measurement apparatus 2 of the second example embodiment, it is assumed that the beam diameter change part 12 includes the storage area 140 and a beam diameter is changed by having the beam diameter change control part 14 rewrite a corresponding entry in the storage area 140. As a matter of course, this assumption is not intended to limit the arrangement of the disclosure of the present application.

Figure 4:
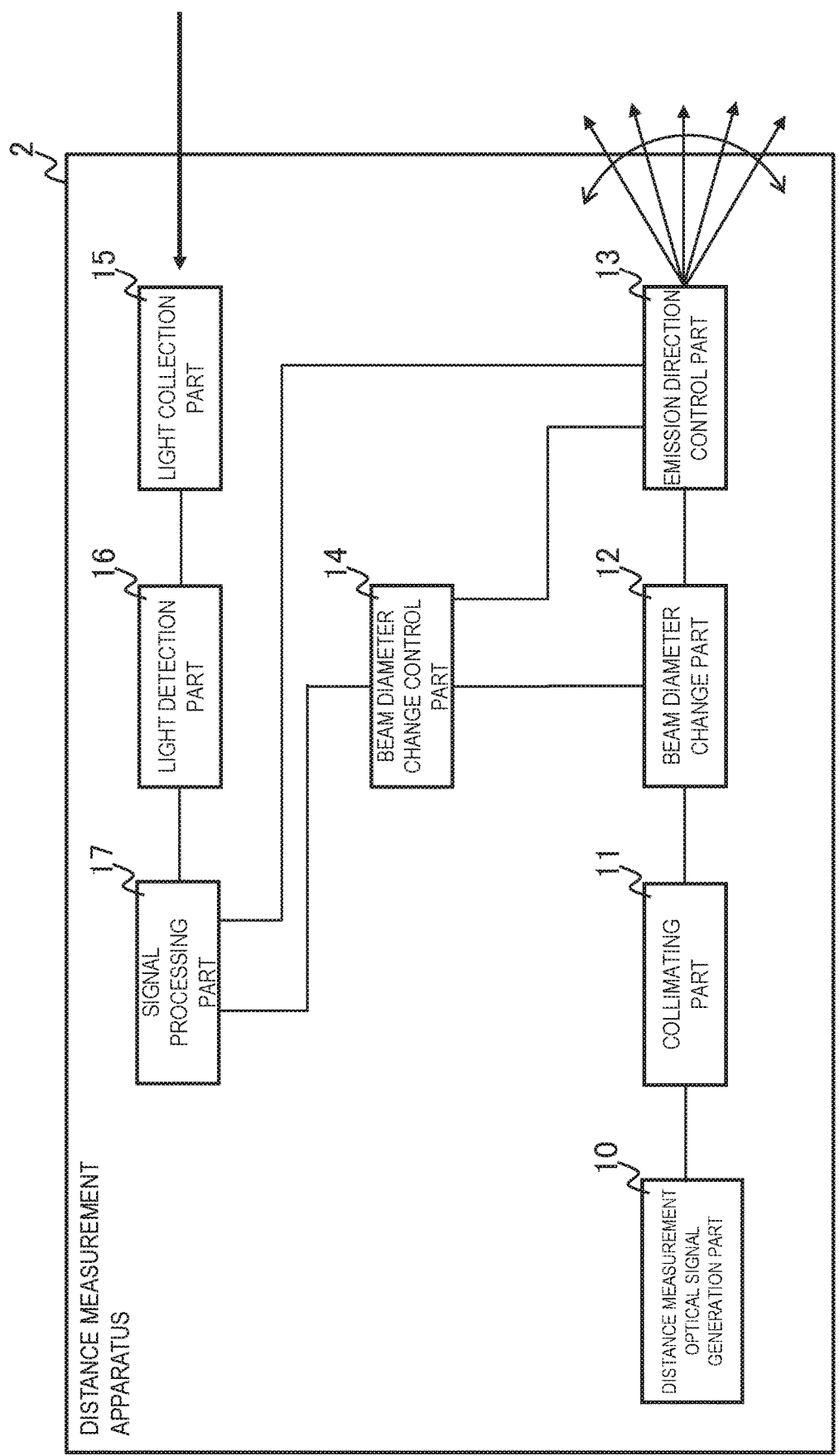
FIG. 4 is a diagram illustrating an arrangement example of a distance measurement apparatus relating to a second example embodiment.

FIG. 4 is a diagram illustrating an arrangement example of the distance measurement apparatus 2 of the second example embodiment. Referring to FIG. 4, the distance measurement apparatus 2 differs from the distance measurement apparatus 1 in that the signal processing part 17 supplies input to the beam diameter change control part 14. The distance measurement apparatus 2 is provided with such input so that the beam diameter can be controlled based on measurement data.

Figure 5:
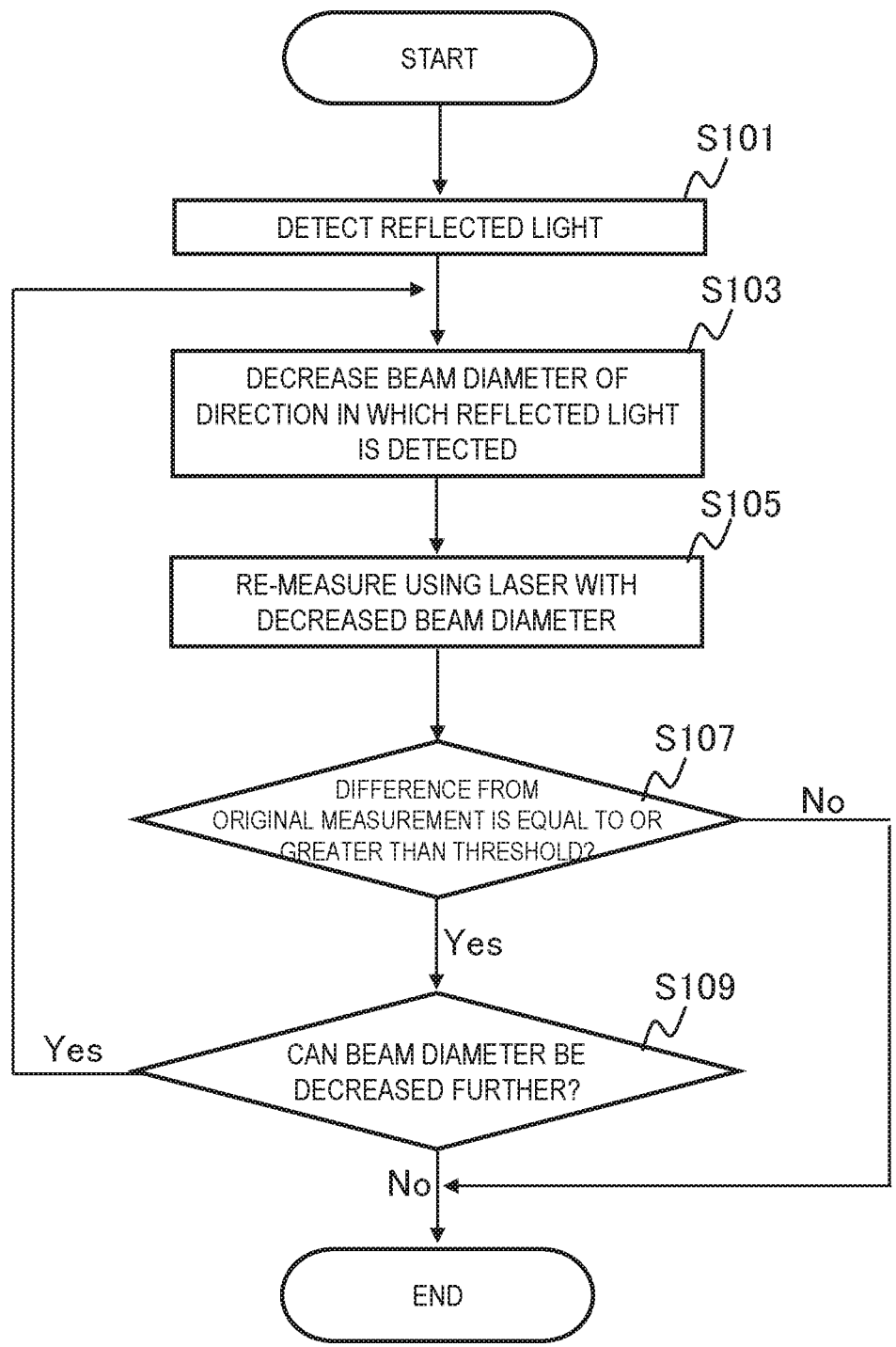
FIG. 5 is a flowchart illustrating an example of the operation of the distance measurement apparatus relating to the second example embodiment.

FIG. 5 is a flowchart illustrating an example of an operation of the distance measurement apparatus 2 of the second example embodiment. Referring to FIG. 5, the following describes an operation of adjusting a beam diameter to decrease the beam diameter when an object is detected.

When the light detection part 16 detects a reflected light, the signal processing part 17 notifies the beam diameter change control part 14 of a measurement result such as an incidence direction of the reflected light and a distance (step S101). It is noted that the measurement result may include luminance in addition to direction and distance.

The beam diameter change control part 14 decreases the beam diameter of the direction in which the reflected light has been detected (step S103). More specifically, the beam diameter change control part 14 rewrites an applicable entry (associated with a direction of the reflected light) in the storage area 140 provided in the beam diameter change part 12.

The beam diameter change part 12 changes the beam diameter to a value set in the step S103 and emits a laser to the emission direction control part 13, which adjusts an emission direction of a laser to emit the laser to outside of the distance measurement apparatus 2.

The signal processing part 17 remeasures an incidence direction of a reflected light and a distance to the object using the beam with the decreased diameter (step S105). The signal processing part 17 notifies a result of the re-measurement to the beam diameter change control part 14.

Next, with respect to the reflected light re-detected by the light detection part 16, the beam diameter change control part 14 calculates a difference between a measurement result of the remeasurement (e.g., a distance) and the previous measurement result.

The beam diameter change control part 14 determines whether or not the difference is equal to or greater than a predetermined threshold value (step S107). Note that in the step S130, adjustment was made to decrease the beam diameter of the laser irradiating the target. Therefore, a result of measurement using the laser of a larger beam diameter and a result of measurement using the laser of a smaller beam diameter on an area which is equivalent or equal to an area measured by the laser of the larger beam diameter, may be compared to calculate a difference between the results. That is, a plurality of results (a plurality of measurement results) using different beam diameters are compared and a difference(s) are calculated.

When the difference is equal to or greater than the threshold value (step S107, "Yes" branch), the beam diameter change control part determines whether or not the beam diameter can be further decreased (step S109).

When the beam diameter can be decreased further (step S109, "Yes" branch), the beam diameter change control part 14 decreases the beam diameter and the signal processing part 17 remeasures a reflected light (the steps S103 and S105).

When the beam diameter cannot be decreased further (step S109. "No" branch), the beam diameter change control part 14 finishes the adjustment of the beam diameter. Note that a beam diameter cannot be decreased, when the adjustment exceeds a range of a beam diameter magnification provided by the beam diameter change part 12 or when a change of the magnification results in an increase of the beam diameter.

As described, the beam diameter change control part 14 calculates a difference between a distance to a target measured by collimated light emitted first (first outgoing light) and a distance to the target measured by collimated light subsequently emitted (second outgoing light). Then, when the difference is equal to or greater than a predetermined threshold value, the beam diameter change control part 14 sets the beam diameter of the second outgoing light to be smaller than the beam diameter of the first outgoing light.

Since a difference that is less than the threshold value (step S107, "No" branch) indicates that a decreased beam diameter will not change a measurement result, the adjustment of the beam diameter is finished.

As described above, the beam diameter change control part 14 in the second example embodiment sets a beam diameter of a collimated light emitted first (first outgoing light) to a predetermined value (first beam diameter). When the first emitted light detects an object, the beam diameter change control part 14 sets a beam diameter of a subsequently emitted collimated light (second outgoing light) to a second beam diameter that is smaller than the first beam diameter. As a result, the beam diameter change part 12 is controlled such that remeasurement with using the second outgoing light on an area where the object is detected is to be performed.

Although the beam diameter of the collimated light emitted from the distance measurement apparatus 2 is decreased based on a difference between results of measurement by two light beams most recently emitted in FIG. 5, the beam diameter may be adjusted based on a distance measured by the first outgoing light. More specifically, the beam diameter change control part 14 may control the beam diameter change part 12 so as to decrease a beam diameter of an outgoing light to be reflected on a measurement target based on a distance between the distance measurement apparatus 2 and the measurement target.

[Variation]

Next, a variation of the second example embodiment will be described.

Figure 6:
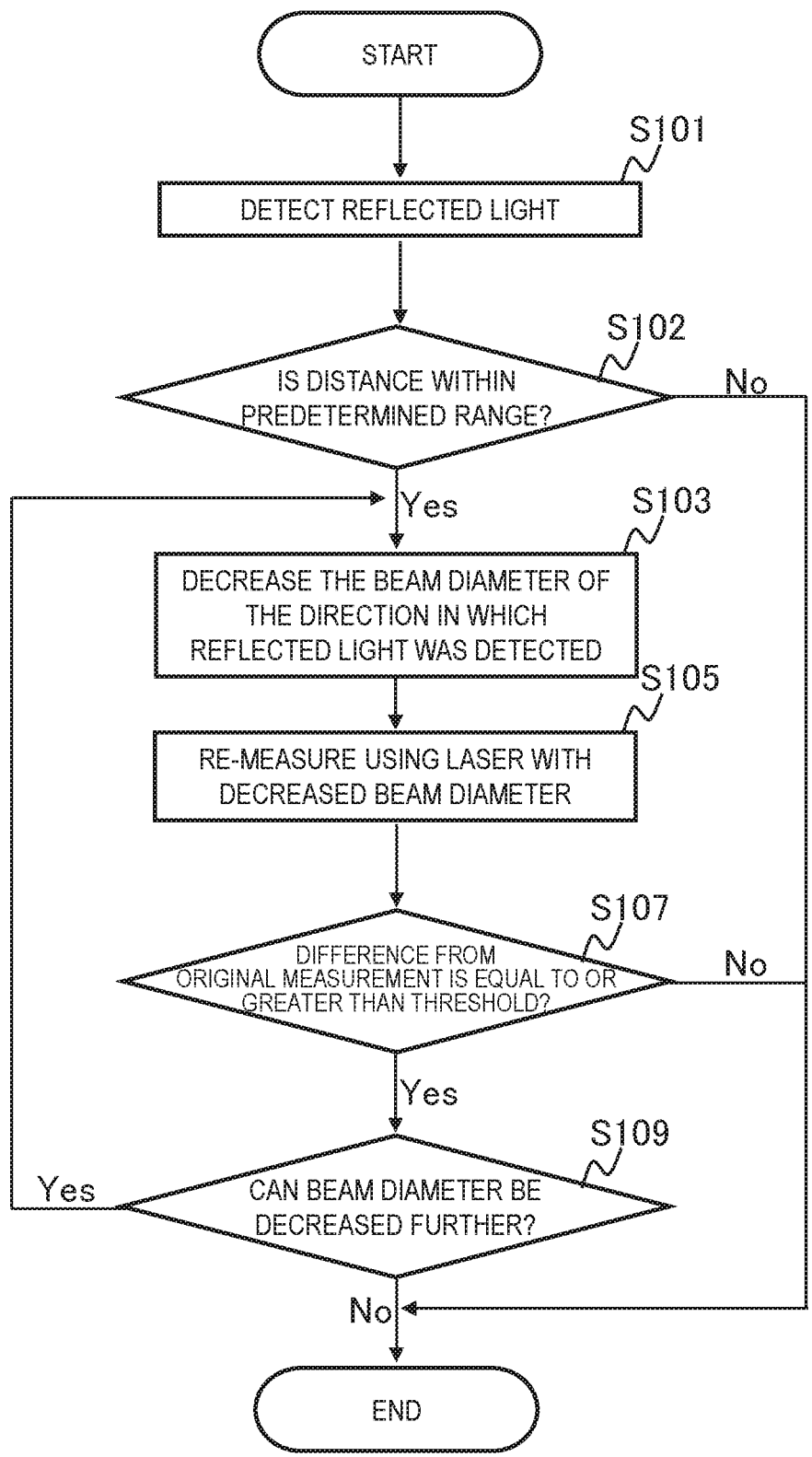
FIG. 6 is a flowchart illustrating another example of the operation of the distance measurement apparatus relating to the second example embodiment.

FIG. 6 is a flowchart illustrating another example of an operation of the distance measurement apparatus 2 of the second example embodiment. The following describes an operation of the distance measurement apparatus 2 that adjusts a beam diameter to be decreased when an object is detected within a predetermined distance, with reference to FIG. 6. Note that, in FIG. 6 and the subsequent drawings, the same processes as those in FIG. 5 are denoted by the same reference signs, and detailed descriptions thereof will be omitted.

The beam diameter change control part 14 holds information on a range, which particularly needs to be examined in detail, as a threshold value. More specifically, the beam diameter change control part 14 determines whether or not any object exists within a predetermined range from the distance measurement apparatus 2 using two thresholds. That is, the beam diameter change control part 14 determines whether or not a distance to an object is within a predetermined range (whether or not a measured distance is farther than a closer threshold and closer than a farther threshold) based on distance information notified by the signal processing part 17 (step S102).

When the measured distance is within a predetermined range (step S102, "Yes"), the beam diameter change control part 14 adjusts the beam diameter to be smaller (the step S103).

When the measured distance is not within the predetermined range (step S102, "No"), the beam diameter change control part 14 does not make any adjustment on the beam diameter.

As described above, the beam diameter change control part 14 determines whether presence of an object within a predetermined range from the distance measurement apparatus 2 using two thresholds, can be detected or not. Further, the beam diameter change control part 14 sets a beam diameter of a subsequently emitted collimated light (second outgoing light) to be smaller (narrower) than a beam diameter of a collimated light emitted first (first outgoing light). As a result, the beam diameter change part 12 is controlled such that remeasurement on the area including an object detected within the predetermined range is to be performed.

Figure 7:
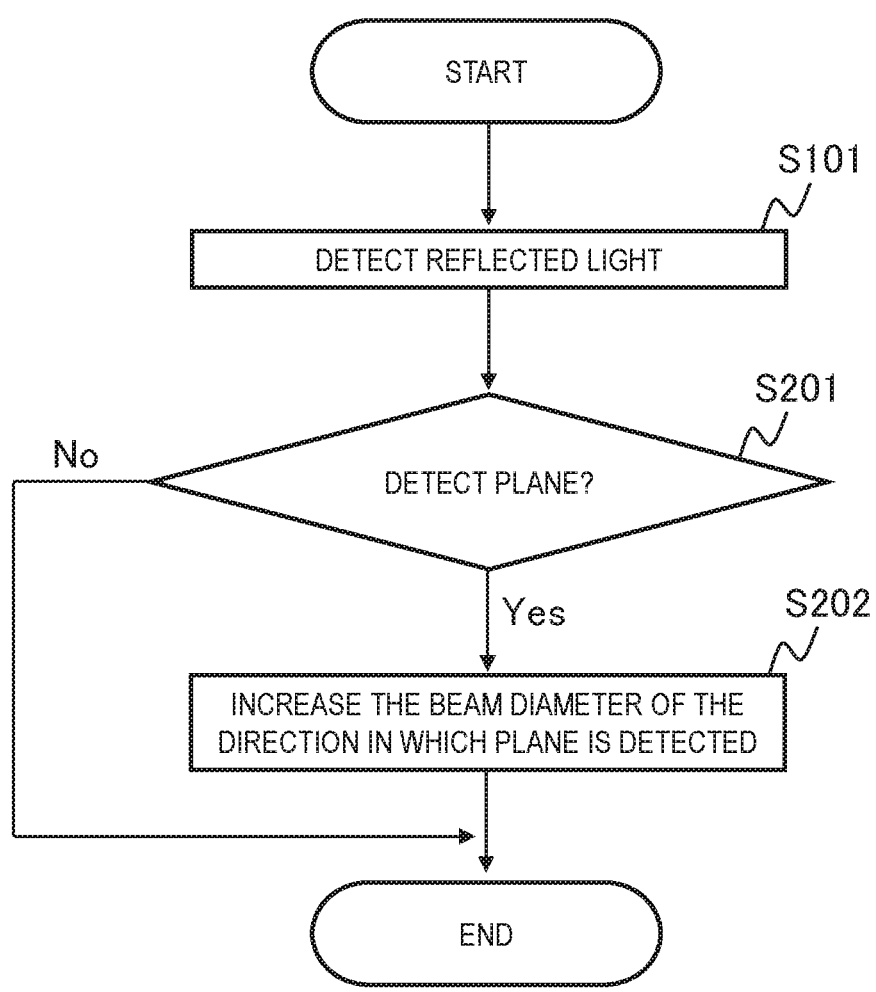
FIG. 7 is a flowchart illustrating another example of the operation of the distance measurement apparatus relating to the second example embodiment.

FIG. 7 is a flowchart illustrating another example of the operation of the distance measurement apparatus 2 relating to the second example embodiment. The following describes the operation of the distance measurement apparatus 2 that adjusts a beam diameter to be larger (wider) when the area of a detected plane is measured, with reference to FIG. 7.

Based on distance information notified by the signal processing part 17, the beam diameter change control part 14 determines whether or not a measurement point in the notified distance forms a plane with a nearby measurement points (step S201).

When determining that these measurement points form a plane (step S201, "Yes" branch), the beam diameter change control part 14 adjusts a beam diameter of laser emitted in a direction in which the plane is detected to be larger (step S202). For example, the beam diameter change control part 14 rewrites a value in a beam diameter field within a predetermined range in a horizontal and a vertical direction in the storage area 140. This operation, based on assumption that a plane also spreads around points at which the plane was detected, can prevent acquisition of useless data on an unmeasured area by widening a beam diameter.

When determining that these measurement points do not form a plane (step S201, "No" branch), the beam diameter change control part 14 finishes the processing. Alternatively, when determining that these measurement points do not form a plane, the beam diameter change control part 14 may further decrease a beam diameter of the outgoing light for measuring the area.

For example, whether or not a plurality of measurement points form a plane can be determined by obtaining a normal vector from a group of three or more measurement points and comparing the normal vector with another normal vector obtained from a group of different measurement points. More specifically, it is determined that a plane is formed when the two vectors are in the same direction. Note that the comparison of the normal vectors may not be so strict, and the determination of whether or not a plane is formed may be based on whether or not the directions of the two normal vectors are within a predetermined range. When the normal vectors are in the same direction, these measurement points can be regarded as existing on an identical plane. Measuring a plane using a laser with a small beam diameter does not make much difference from measuring the plane using a laser with a larger beam diameter. That is, finely measuring a plane using a laser with a small beam diameter results in a large amount of data, which has no advantage.

As described, when a plane is detected from a plurality of items of measurement data, the beam diameter change control part 14 controls the beam diameter change part 12 to increase a beam diameter of an outgoing light for measuring an area including a detected plane. As a result, an amount of useless data is reduced.

A variation of the distance measurement apparatus 2 of the second example embodiment is able to eliminate waste due to measurement of a plane using a laser with a small diameter (eliminating unnecessary data).

The effect of the second example embodiment will be described. The distance measurement apparatus 2 of the second example embodiment is configured to adjust a beam diameter of a laser based on measurement results. This allows the apparatus to acquire detailed data on only an area that need to be measured in detail such as an area where an object is detected or a nonplanar area. In other words, by avoiding useless data acquisition, an amount of acquired data can be reduced.

THIRD EXAMPLE EMBODIMENT

Next, a third example embodiment will be described in detail with reference to the drawings.

Figure 8:
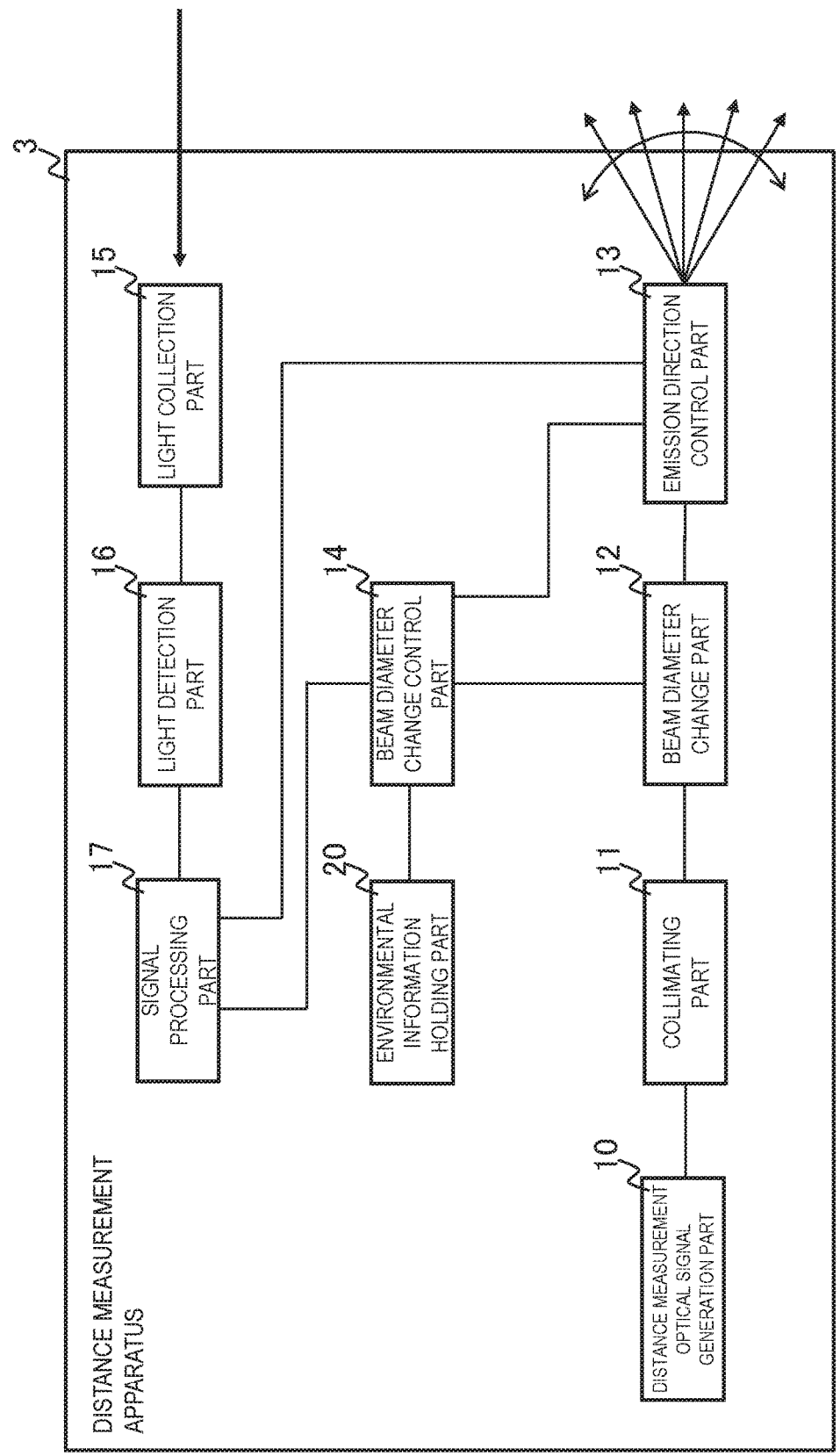
FIG. 8 is a diagram illustrating an arrangement example of a distance measurement apparatus relating to a third example embodiment.

FIG. 8 is a diagram illustrating an arrangement example of a distance measurement apparatus 3 relating to the third example embodiment. With reference to FIG. 8, the distance measurement apparatus 3 comprises the arrangement of the distance measurement apparatus 2 shown in FIG. 4 with an environmental information storage part 20 added thereto. While FIG. 8 illustrates the arrangement of the distance measurement apparatus 2 of FIG. 4 with the environmental information storage part 20 added thereto, the arrangement of the distance measurement apparatus 1 with the environmental information storage part 20 added thereto may also be used.

The environmental information storage part 20 is a means that stores shape and size of a target object that needs to be detected by the distance measurement apparatus 3.

Figure 9:
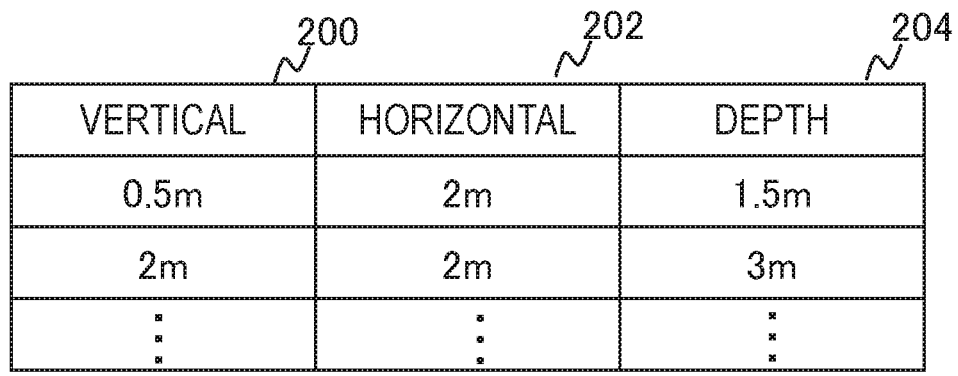
FIG. 9 is a diagram illustrating an example of an environmental information storage part relating to the third example embodiment.

FIG. 9 is a diagram illustrating an example of table information held by the environmental information storage part 20 in the third example embodiment. Referring to FIG. 9, the environmental information storage part 20 includes a table including a vertical size field 200 that holds a vertical size of a detection target, a horizontal size field 202 that holds a horizontal size, and a depth size field 204 that holds a depth size.

Figure 10:
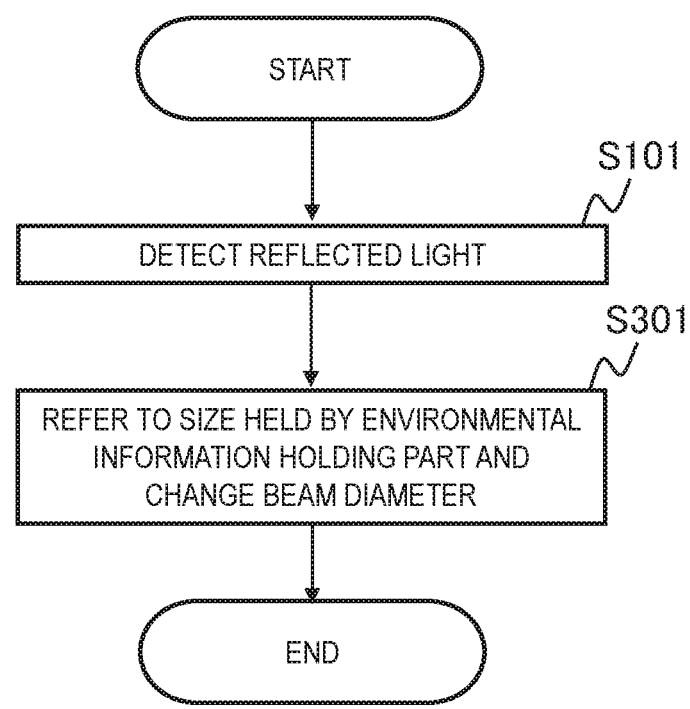
FIG. 10 is a flowchart illustrating an example of the operation of the distance measurement apparatus relating to the third example embodiment.

FIG. 10 is a flowchart illustrating an example of the operation of the distance measurement apparatus 3 relating to the third example embodiment. The following describes the operation of the distance measurement apparatus 3 that adjusts a beam diameter of a laser utilizing the information in the environmental information storage part 20, with reference to FIG. 10.

When receiving a notification of distance information from the signal processing part 17 (that an object has been detected), the beam diameter change control part 14 refers to the environmental information storage part 20.

Then, the beam diameter change control part 14 adjusts a beam diameter so as to not exceed a minimum size value held in the environmental information storage part 20 (step 301). For example, in the example of FIG. 9, since 0.5 m in a vertical direction is the minimum size, the beam diameter change control part 14 adjusts the beam diameter so as to not exceed 0.5 m.

As described, when outgoing light detects an object, the beam diameter change control part 14 refers to the environmental information storage part 20 and controls the beam diameter change part 12 so that a beam diameter of an outgoing light emitted in a direction in which the object has been detected is smaller than a size of the detection target.

Alternatively, the distance measurement apparatus 3 may further include a plurality of the environmental information storage parts 20 that hold different sizes of detection targets. That is, a plurality of the environmental information storage parts 20 may be provided according to sizes of targets that need to be detected. In this case, the distance measurement apparatus 3 includes a plurality of the distance measurement optical signal generation parts 10, the collimating parts 11, the beam diameter change parts 12, and the emission direction control parts 13.

The beam diameter change control part 14 refers to the environmental information storage parts 20 in a descending order of sizes of detection targets held therein to adjust a beam diameter. More specifically, in the arrangement described above, a beam diameter of a first laser is determined based on information in the environmental information storage part 20 that holds a size of a large target. Then, the beam diameter of a second laser is determined based on information in the environmental information storage part 20 that holds a size of a smaller target. Further, the beam diameter of an Nth laser (N is a positive integer) is determined based on information in the environmental information storage part 20 that holds a size of the smallest target. The distance measurement apparatus 3 may be configured and operate as described above.

The reason for providing a plurality of the environmental information storage parts 20 as described above is that, if a difference between sizes held in the same environmental information storage part 20 is large, the beam diameter may possibly be determined according to a size of a small target, as a result of which useless measurement may possibly be performed.

FIG. 11 is a diagram illustrating another arrangement example of an environmental information storage part 20*b* in the third example embodiment. Referring to FIG. 11, the environmental information storage part 20*b* is configured to hold position and size of a part (portion) that needs to be detected from a detection target object, in addition to a size of the detection target object.

For example, in a case where a box that stores objects and the handle of the box are to be detected, the environmental information storage part 20*b* holds a size of the box as a size of a target, and position and size of the handle as position and size of a part that needs to be detected.

Note that a position field 206 in FIG. 11 indicates a position of a detected part in a two-dimensional coordinate system with an origin at a lower left of the target, for example. A size field 208 in FIG. 11 indicates a size when the detected part is represented by a rectangular shape with a position indicated in the position field 206 as a center, for example.

Figure 12:
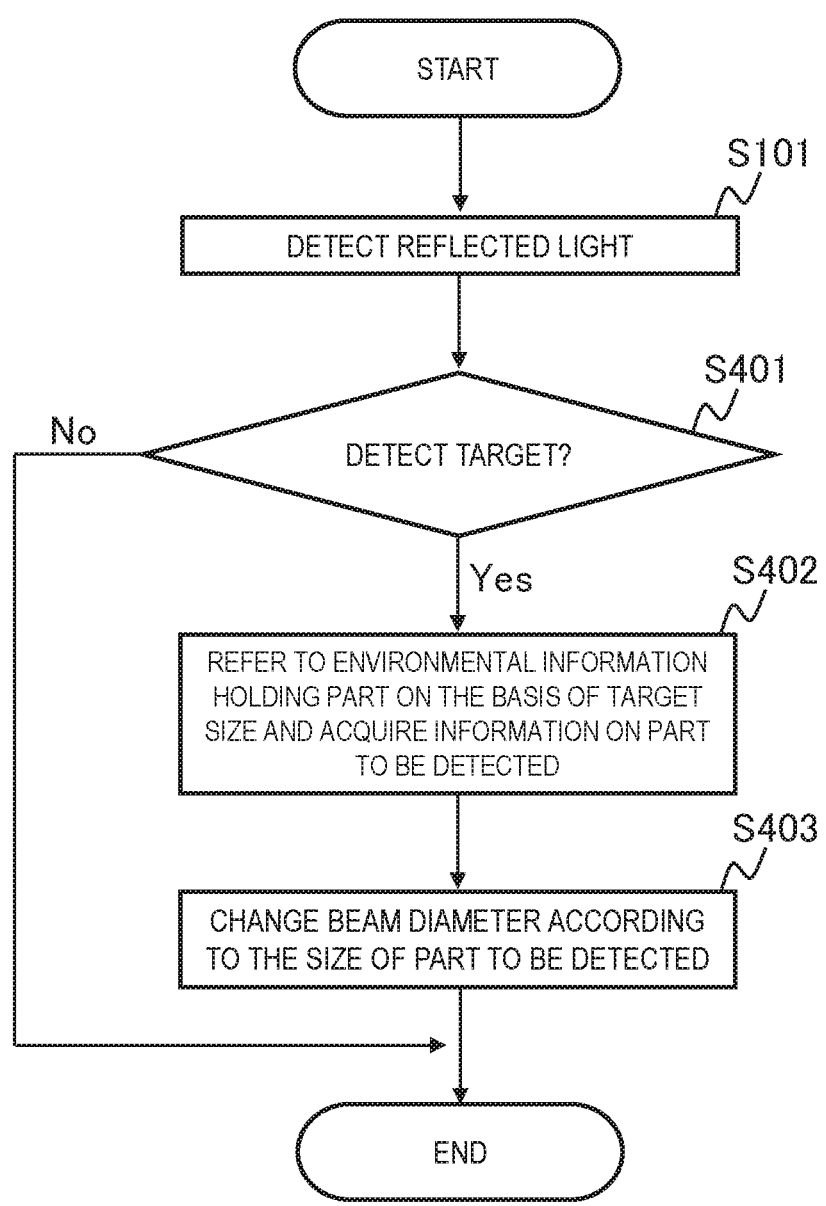
FIG. 12 is a flowchart illustrating another example of the operation of the distance measurement apparatus relating to the third example embodiment.

FIG. 12 is a flowchart illustrating another example of an operation of the distance measurement apparatus 3 of the third example embodiment. The following describes the distance measurement apparatus that adjusts a beam diameter according to a detected part of a target, with reference to FIG. 12.

The beam diameter change control part 14 determines whether or not a target is detected from data having a plurality of measurement points (step S401).

In order to detect the target, the beam diameter change control part 14 measures a direction in which an object is detected while controlling a beam diameter to not exceed a size of the target. Then the beam diameter change control part 14 extracts a plane and edges from the measurement data and compares a size of the plane and edges with a size of a detection target to see if they match.

When a target is detected (step S401, "Yes" branch), the beam diameter change control part 14 refers to the environmental information storage part 20*h* based on the size of the detected target, and obtains information on a part that particularly needs to be detected (step S402).

Next, the beam diameter change control part 14 changes the beam diameter so as to not exceed the size of the part that particularly needs to be detected based on the size of the part to be detected (step S403). At this time, the beam diameter change control part 14 determines in which entry in the storage area 140 the beam diameter should be changed, based on a direction in which the object is detected and the information of the position of the part that particularly needs to be detected.

In the flowchart shown in FIG. 12, the beam diameter is adjusted so that a specific part of the target can be measured in detail, but a beam diameter may be increased so as not to measure the specific part in detail. In this case, the beam diameter change control part 14 may adjust the beam diameter to exceed the size of the part to be detected in the step S403 in FIG. 12. For example, when the distance measurement apparatus 3 is used to detect presence of a person, it is effective to increase the beam diameter. Although it is necessary to have the beam diameter small enough to be able to recognize that s detected object is a person, it is not desirable, due to privacy concerns, etc., to measure the person in detail to an extent that facial features can be recognized.

As described above, the environmental information storage part 20*b* is configured to further hold information on position and size of a part constituting a detection target. After detecting a detection target, the beam diameter change control part 14 may determine a beam diameter of an outgoing light according to the size of a part constituting the detection target.

The effect of the third example embodiment will be described. In the third example embodiment, the distance measurement apparatus 3 is configured to adjust a beam diameter of a laser based on a distance at which an object is detected and a size of a target that needs to be detected. This allows the apparatus to measure a target using a beam diameter necessary to measure the target. As a result, the number of beam diameter changes required while measuring a direction in which the target is detected can be reduced, thereby decreasing an amount of acquired data.

SPECIFIC EXAMPLE

The following describes an arrangement and operation of a specific example for implementing the example embodiments. Note that this specific example indicates an implementation example of the disclosure of the present application, and the implementation (realization) of the disclosure of the present application is not limited to the arrangement and operation of the specific example.

Figure 13:
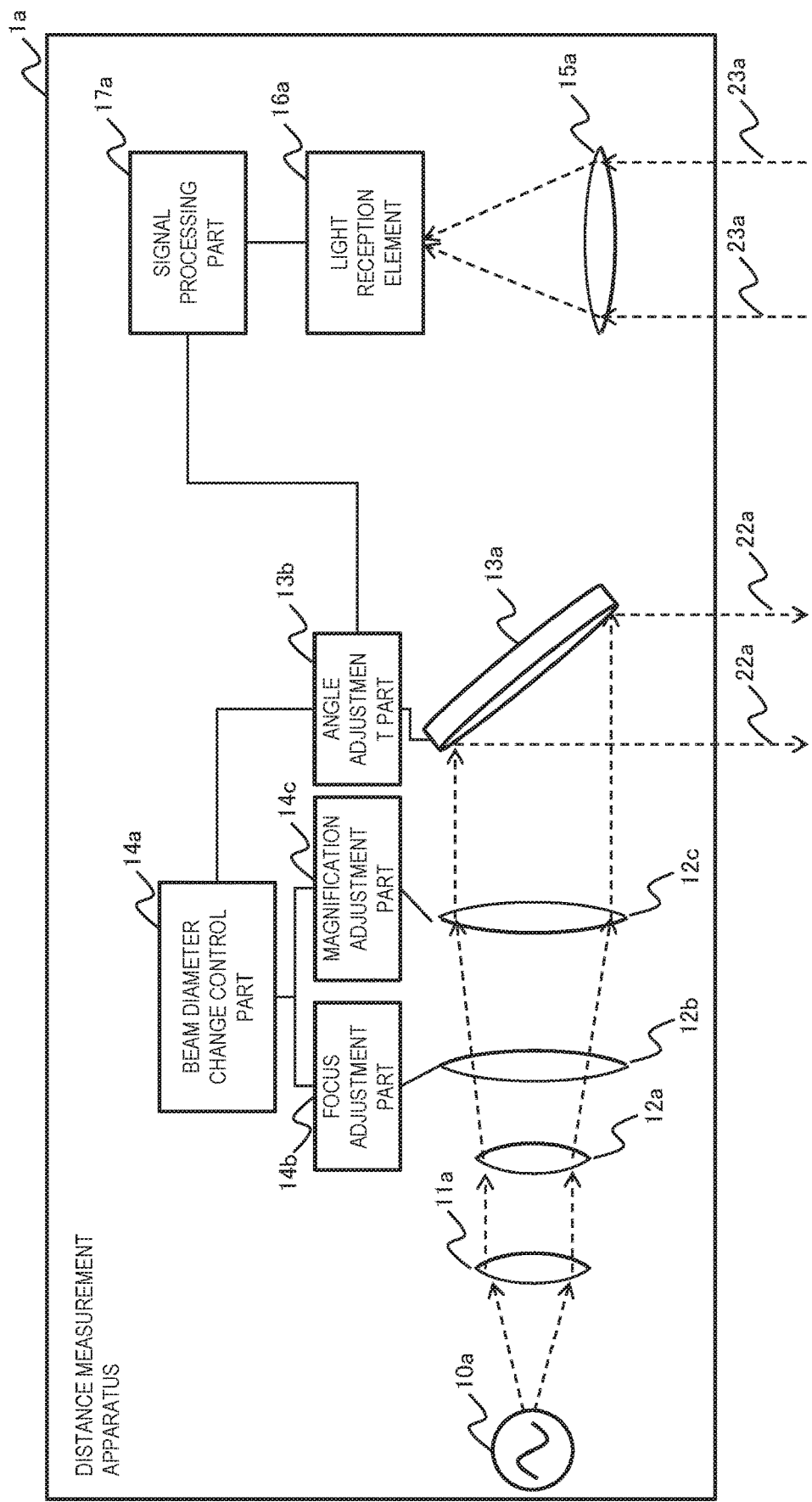
FIG. 13 is a diagram illustrating a specific arrangement of the distance measurement apparatus according to the disclosure of the present application.

FIG. 13 is a diagram illustrating a specific arrangement of a distance measurement apparatus 1a according to the disclosure of the present application. Referring to FIG. 13, the distance measurement apparatus 1a includes a laser light source 10a, a collimator lens 11a, a beam expander incidence side lens 12a, a beam expander focus adjustment lens 12b, and a beam expander emission side lens 12c. In addition, the distance measurement apparatus 1a is configured to include a mirror 13a, an angle adjustment part 13b, a beam diameter change control part 14a, a focus adjustment part 14b, a magnification adjustment part 14c, a light collecting lens 15a, a light reception element 16a, and a signal processing part 17a.

The beam diameter change part 12 in FIG. 2 may be constituted by the beam expander incidence side lens 12a, the beam expander focus adjustment lens 12b, and the beam expander emission side lens 12c.

The focus adjustment part 14b adjusts a position of the beam expander focus adjustment lens 12b. The magnification adjustment part 14c adjusts a position of the beam expander emission side lens 12c, The beam diameter change control part 14a controls the focus adjustment part 14b and the magnification adjustment part 14c, A beam diameter can be changed by having the beam diameter change control part 14a control the focus adjustment part 14b and the magnification adjustment part 14c.

Note that the beam expander incidence side lens 12a, the beam expander focus adjustment lens 12b, the beam expander emission side lens 12c, the focus adjustment part 14h, and the magnification adjustment part 14c provide functions of a variable magnification beam expander. This arrangement, however, can be replaced by a variable magnification beam expander realized by a method different from the arrangement described above.

The emission direction control part 13 in FIG. 2 may be constituted by the mirror 13a and the angle adjustment part 13b. The angle adjustment part 13b adjusts an emission direction of an outgoing light 22a by changing an inclination of the mirror 13a. Note that the emission direction can be controlled with a lens that refracts an incident light, in addition to changing an angle of the mirror 13a. That is, the arrangement using the mirror 13a and the angle adjustment part 13b to control the emission direction is merely an example.

An operation of the specific example shown in FIG. 13 will be described.

First, a directional light (laser) is emitted by having the laser light source 10a emit a light and having the collimator lens 11a collimate the emitted light.

Next, the laser emitted from the collimator lens 11a has a beam diameter adjusted through the beam expander incidence side lens 12a, the beam expander focus adjustment lens 12b, and the beam expander emission side lens 12c and then is made incident on the mirror 13a.

Positions of the beam expander focus adjustment lens 12h and the beam expander emission side lens 12c are adjusted by the focus adjustment part 14h and the magnification adjustment part 14c under control of the beam diameter change control part 14a.

The laser incident on the mirror 13a is reflected and emitted to outside of the distance measurement apparatus 1a as an outgoing light 22a. The outgoing light 22a hits an object and a part of a reflected light (23a) returns to the distance measurement apparatus 1a. The returning reflected light 23a is collected by the light collecting lens 15a and fed to the light reception element 16a.

The light reception element 16a detects the reflected light 23a and sends an electric signal indicating the detection of the reflected light 23a to the signal processing part 17a. The signal processing part 17a calculates a distance to a detected object, based on, for example, an emission direction and an emission time of the outgoing light 22a, and a time when the electric signal from the light reception element 16a was detected.

The functions of the distance measurement apparatus described in the example embodiments are realized by processing modules (e.g., the beam diameter change control part 14, the signal processing part 17, etc.) and hardware elements shown in FIG. 13 (e.g., the light collecting lens 15a). For example, the processing modules are realized by causing a CPU (Central Processing Unit) to execute a program stored in a memory of the distance measurement apparatus 1. Further, this program may be updated by downloading an update, via a network, or using a storage medium storing the program. In addition, the processing modules may be realized by a semiconductor chip. That is, the functions performed by the processing modules may be realized by running software on some kind of hardware.

Further, a plurality of steps (processes) in the plurality of flowcharts used in the description above are described in a sequence, however, the execution order of the steps performed in each example embodiment is not limited to the described sequence. In each example embodiment, the order of the steps shown in the drawing can be changed to the extent that the substance thereof is not affected, such as executing some processes in parallel. Further, the example embodiments described above may be combined as long as there is no conflict.

From the above description, industrial applicability of the present invention is clear, and among applications that use a distance measurement apparatus using a laser, the present invention can be suitably applied to ones that require real-time processing.

Some or all of the example embodiments above can be described as (but not limited to) the following modes.

[Mode 1]

As the distance measurement apparatus relating to the first aspect.

[Mode 2]

The distance measurement apparatus according to preferably Mode 1, wherein the beam diameter change part comprises a storage area that stores the emission direction of the outgoing light in association with the beam diameter thereof, and the beam diameter change control part identifies an area in the storage area storing the beam diameter of the outgoing light to be changed based on an identifier indicating the emission direction of the outgoing light to be changed when controlling the beam diameter change part to change the beam diameter of the outgoing light, and changes the beam diameter of the outgoing light to be changed by changing the identified area.

[Mode 3]

The distance measurement apparatus according to preferably Mode 1 or 2, wherein the beam diameter change control part controls the beam diameter change part to set a beam diameter of a first outgoing light to a first beam diameter, and when an object is detected by the first outgoing light, set a beam diameter of a second outgoing light to a second beam diameter smaller than the first beam diameter, such that remeasurement with using the second outgoing light on an area where the object is detected is to be performed.

[Mode 4]

The distance measurement apparatus according to preferably Mode 3, wherein when presence of an object is detected within a predetermined range from the distance measurement apparatus using two threshold values, the beam diameter change control part controls the beam diameter change part to set the beam diameter of the second outgoing light to be smaller than the beam diameter of the first outgoing light, such that remeasurement on an area including the object detected within the predetermined range is to be performed.

[Mode 5]

The distance measurement apparatus according to preferably Mode 4, wherein the beam diameter change control part calculates the difference between the distance to an object measured by the first outgoing light and the distance to an object measured by the second outgoing light, and sets the beam diameter of the second outgoing light to be smaller than the beam diameter of the first outgoing light when the difference is equal to or greater than a predetermined threshold value.

[Mode 6]

The distance measurement apparatus according to preferably any one of Modes 1 to 5, wherein the beam diameter change control part controls the beam diameter change part so as to decrease the beam diameter of outgoing light reflected on a measurement target based on the distance between the distance measurement apparatus and the measurement target.

[Mode 7]

The distance measurement apparatus according to preferably any one of Modes 1 to 6, wherein the beam diameter change control part controls the beam diameter change part so as to increase the beam diameter of outgoing light for measuring an area including a detected plane when the plane is detected from a plurality of pieces of measurement data.

[Mode 8]

The distance measurement apparatus according to preferably any one of Modes 1 to 7 further comprising an environmental information storage part that holds the shape of a detection target that needs to be detected, wherein the beam diameter change control part refers to the environmental information storage part when the outgoing light detects an object and controls the beam diameter change part so that the beam diameter of outgoing light emitted in the direction in which the object is detected is smaller than the size of the detection target.

[Mode 9]

The distance measurement apparatus according to preferably Mode 8 further comprising a plurality of the environmental information storage parts each of which holds a different size of the detection target, wherein the beam diameter change control part refers to the environmental information storage parts in descending order of the size of the detection targets held therein.

[Mode 10]

The distance measurement apparatus according to preferably Mode 8 or 9, wherein the environmental information storage part further holds information on the position and size of a part constituting the detection target, and the beam diameter change control part determines the beam diameter of the outgoing light according to the size of the part constituting the detection target after the detection target is detected.

[Mode 11]

As the distance measurement method relating to the second aspect.

[Mode 12]

As the program relating to the third aspect.

Further, as Mode 1, Modes 11 and 12 can be developed into Modes 2 to 10.

Further, the disclosure of each Patent Literatures cited above is incorporated herein in its entirety by reference thereto. It is to be noted that it is possible to modify or adjust the example embodiments or examples within the whole disclosure of the present invention (including the claims) and based on the basic technical concept thereof. Further, it is possible to variously combine or select a wide variety of the disclosed elements (including the individual elements of the individual claims, the individual elements of the individual example embodiments or examples and the individual elements of the individual figures) within the scope of the whole disclosure of the present invention. That is, it is self-explanatory that the present invention includes any types of variations and modifications to be done by a skilled person according to the whole disclosure including the claims, and the technical concept of the present invention. Particularly, any numerical ranges disclosed herein should be interpreted that any intermediate values or subranges falling within the disclosed ranges are also specifically disclosed even without specific recital thereof.

The invention claimed is:

1. A distance measurement apparatus comprising:
    an optical signal generator that generates a distance measurement optical signal for measuring a distance to a target object;
    a collimator that converts the distance measurement optical signal generated by the optical signal generator to a collimated light;
    a beam diameter change part that is able to change a beam diameter of the collimated light emitted by the collimator;
    an emission direction control part that controls an emission direction of the collimated light with the beam diameter thereof changed by the beam diameter change part; and
    a controller that controls changing of the beam diameter by the beam diameter change part according to the emission direction of an outgoing light emitted from the distance measurement apparatus to outside thereof,
    wherein the controller controls the beam diameter change part to set a beam diameter of a first outgoing light to a first beam diameter, and when an object is detected by the first outgoing light, set a beam diameter of a second outgoing light to a second beam diameter smaller than the first beam diameter, such that remeasurement with using the second outgoing light on an area where the object is detected is to be performed, and
    wherein the controller calculates a difference between a distance to the object measured by the first outgoing light and a distance to the object measured by the second outgoing light, and sets the beam diameter of the second outgoing light to be smaller than the beam diameter of the first outgoing light, when the difference is equal to or greater than a predetermined threshold value.

2. The distance measurement apparatus according to claim 1, wherein the beam diameter change part includes
a storage that stores the emission direction of the outgoing light in association with a beam diameter thereof, and wherein
the controller identifies an area in the storage storing the beam diameter of the outgoing light to be changed, based on an identifier indicating the emission direction of the outgoing light to be changed, when controlling the beam diameter change part to change the beam diameter of the outgoing light, and changes the beam diameter of the outgoing light to be changed by changing the identified area in the storage.

3. The distance measurement apparatus according to claim 1, wherein, when presence of an object is detected within a predetermined range from the distance measurement apparatus using two threshold values,
the controller controls the beam diameter change part to set the beam diameter of the second outgoing light to be smaller than the beam diameter of the first outgoing light, such that remeasurement on an area including the object detected within the predetermined range is to be performed.

4. The distance measurement apparatus according to claim 1, wherein the controller controls the beam diameter change part to decrease the beam diameter of an outgoing light that is to be reflected on a target object to be measured based on a distance between the distance measurement apparatus and the target object to be measured.

5. The distance measurement apparatus according to claim 1, wherein the beam diameter change control part controls the beam diameter change part to increase the beam diameter of an outgoing light for measuring an area including a detected plane when the plane is detected from a plurality of items of measurement data.

6. The distance measurement apparatus according to claim 1, further comprising
an environmental information storage part that holds shape of a target object that needs to be detected, wherein
when an object is detected by the outgoing light, the controller refers to the environmental information storage part and controls the beam diameter change part to set the beam diameter of the outgoing light emitted in a direction in which the object is detected is smaller than a size of the target object to be detected.

7. The distance measurement apparatus according to claim 6, further comprising
a plurality of the environmental information storage parts, each holding a different size of the target object to be detected, wherein
the controller refers to the environmental information storage parts in descending order of sizes of the target objects to be detected held therein.

8. The distance measurement apparatus according to claim 6, wherein the environmental information storage part further holds information on position and size of a part constituting the target object to be detected, and
the controller determines the beam diameter of the outgoing light according to a size of a part constituting the target object to be detected after the target object is detected.

9. The distance measurement apparatus according to claim 1, wherein the controller obtains the emission direction of the outgoing light notification from the emission direction control part or based on time information.

10. The distance measurement apparatus according to claim 1, wherein the beam diameter change part includes a variable magnification beam expander.

11. The distance measurement apparatus according to claim 1, wherein the emission direction control part includes
a lens to refract the collimated light having the beam diameter changed, or
a mirror to reflect the collimated light having the beam diameter changed and made incident to thereto, an inclination angle of the mirror adjustable.

12. A distance measurement method in a distance measurement apparatus, the method comprising:
generating a distance measurement optical signal for measuring the distance to a target object;
collimating the distance measurement optical signal to a collimated light;
changing a beam diameter of the collimated light; and
changing an emission direction of the collimated light with a beam diameter changed;
obtaining the emission direction of an outgoing light emitted by the distance measurement apparatus;
controlling the changing of the beam diameter performed by the beam diameter change part according to the emission direction obtained;
setting a beam diameter of a first outgoing light to a first beam diameter;
when an object is detected by the first outgoing light, setting a beam diameter of a second outgoing light to a second beam diameter smaller than the first beam diameter to control such that remeasurement with using the second outgoing light on an area where the object is detected is to be performed;
calculating a difference between a distance to the object measured by the first outgoing light and a distance to the object measured by the second outgoing light; and
setting the beam diameter of the second outgoing light to be smaller than the beam diameter of the first outgoing light, when the difference is equal to or greater than a predetermined threshold value.

13. The distance measurement method according to claim 12, comprising:
when presence of an object is detected within a predetermined range from the distance measurement apparatus using two threshold values,
setting the beam diameter of the second outgoing light to be smaller than the beam diameter of the first outgoing light to control such that remeasurement on an area including the object detected within the predetermined range is to be performed.

14. The distance measurement method according to claim 12, comprising:
decreasing the beam diameter of an outgoing light that is to be reflected on a target object to be measured based on a distance between the distance measurement apparatus and the target object to be measured.

15. The distance measurement method according to claim 12, comprising
increasing the beam diameter of an outgoing light for measuring an area including a detected plane when the plane is detected from a plurality of items of measurement data.

16. A non-transitory computer readable medium storing thereon a program causing a computer provided in a distance measurement apparatus including:
an optical signal generator that generates a distance measurement optical signal for measuring the distance to a target object;

a collimator that converts the distance measurement optical signal generated by the optical signal generator to a collimated light which is a parallel light;

a beam diameter change part configured to be able to change a beam diameter of the collimated light emitted by the collimating part; and an emission direction control part that changes an emission direction of the collimated light with a beam diameter changed by the beam diameter change part, to execute processing comprising:

obtaining the emission direction of an outgoing light emitted by the distance measurement apparatus;

controlling the changing of the beam diameter performed by the beam diameter change part according to the emission direction obtained;

setting a beam diameter of a first outgoing light to a first beam diameter;

when an object is detected by the first outgoing light, setting a beam diameter of a second outgoing light to a second beam diameter smaller than the first beam diameter to control such that remeasurement with using the second outgoing light on an area where the object is detected is to be performed;

calculating a difference between a distance to the object measured by the first outgoing light and a distance to the object measured by the second outgoing light; and setting the beam diameter of the second outgoing light to be smaller than the beam diameter of the first outgoing light, when the difference is equal to or greater than a predetermined threshold value.

* * * * *